(12) United States Patent
Xie et al.

(10) Patent No.: US 8,670,548 B2
(45) Date of Patent: Mar. 11, 2014

(54) JUMPING CALLERS HELD IN QUEUE FOR A CALL CENTER ROUTING SYSTEM

(75) Inventors: Qiaobing Xie, Chesterfield, MO (US); S. James P. Spottiswoode, Beverly Hills, CA (US)

(73) Assignee: Satmap International Holdings Limited, Hamilton (BM)

( * ) Notice: Subject to any disclaimer, the term of this patent is extended or adjusted under 35 U.S.C. 154(b) by 908 days.

(21) Appl. No.: 12/331,181

(22) Filed: Dec. 9, 2008

(65) Prior Publication Data

US 2009/0190749 A1  Jul. 30, 2009

Related U.S. Application Data

(63) Continuation-in-part of application No. 12/021,251, filed on Jan. 28, 2008, and a continuation-in-part of application No. 12/266,418, filed on Nov. 6, 2008.

(60) Provisional application No. 61/084,201, filed on Jul. 28, 2008.

(51) Int. Cl.
    *H04M 3/00*  (2006.01)
(52) U.S. Cl.
    USPC ................................ 379/265.01; 379/266.01
(58) Field of Classification Search
    USPC .............................. 379/265.01, 266.01, 93.03
    See application file for complete search history.

(56) References Cited

U.S. PATENT DOCUMENTS

| | | | |
|---|---|---|---|
| 5,155,763 A | 10/1992 | Bigus et al. | |
| 5,206,903 A | 4/1993 | Kohler et al. | |
| 5,702,253 A | 12/1997 | Bryce et al. | |
| 5,825,869 A | 10/1998 | Brooks et al. | |
| 5,903,641 A | 5/1999 | Tonisson | |
| 5,926,538 A | 7/1999 | Deryugin et al. | |
| 6,052,460 A | 4/2000 | Fisher et al. | |

(Continued)

FOREIGN PATENT DOCUMENTS

| | | |
|---|---|---|
| EP | 0 493 292 A2 | 7/1992 |
| EP | 0 949 793 A | 10/1999 |

(Continued)

OTHER PUBLICATIONS

International Search Report mailed on Feb. 24, 2010, for PCT Patent Application No. PCT/US2009/066254, filed on Dec. 1, 2009, 4 pages.

(Continued)

*Primary Examiner* — Rasha Al Aubaidi

(74) *Attorney, Agent, or Firm* — Foley & Lardner LLP

(57) ABSTRACT

Methods and systems are provided for routing callers to agents in a call-center routing environment. An exemplary method includes identifying caller data for a caller in a queue of callers, and jumping or moving the caller to a different position within the queue based on the caller data. The caller data may include one or both of demographic data and psychographic data. The caller can be jumped forward or backward in the queue relative to at least one other caller. Jumping the caller may further be based on comparing the caller data with agent data via a pattern matching algorithm and/or computer model for predicting a caller-agent pair outcome. Additionally, if a caller is held beyond a hold threshold (e.g., a time, "cost" function, or the like) the caller may be routed to the next available agent.

12 Claims, 8 Drawing Sheets

(56) References Cited

U.S. PATENT DOCUMENTS

| | | |
|---|---|---|
| 6,064,731 A | 5/2000 | Flockhart et al. |
| 6,163,607 A | 12/2000 | Bogart et al. |
| 6,222,919 B1 | 4/2001 | Hollatz et al. |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,639,976 B1 | 10/2003 | Shellum et al. |
| 6,661,889 B1 | 12/2003 | Flockhart |
| 6,704,410 B1 | 3/2004 | McFarlane et al. |
| 6,714,643 B1 | 3/2004 | Gargeya et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,092,509 B1 | 8/2006 | Mears et al. |
| 7,103,172 B2 | 9/2006 | Brown et al. |
| 7,209,549 B2 | 4/2007 | Reynolds et al. |
| 7,231,032 B2 | 6/2007 | Nevman et al. |
| 7,236,584 B2 | 6/2007 | Torba |
| 7,245,716 B2 * | 7/2007 | Brown et al. ............ 379/266.01 |
| 7,245,719 B2 | 7/2007 | Kawada et al. |
| 7,266,251 B2 | 9/2007 | Rowe |
| 7,269,253 B1 | 9/2007 | Wu et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,229,102 B2 | 7/2012 | Knott et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,433,597 B2 | 4/2013 | Chishti et al. |
| 2002/0018554 A1 | 2/2002 | Jensen et al. |
| 2002/0046030 A1 | 4/2002 | Haritsa et al. |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0043986 A1 | 2/2005 | McConnell et al. |
| 2005/0129212 A1 | 6/2005 | Parker |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts, Sr. |
| 2006/0184040 A1 | 8/2006 | Keller et al. |
| 2006/0222164 A1 | 10/2006 | Contractor et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121829 A1 | 5/2007 | Tal et al. |
| 2007/0154007 A1 | 7/2007 | Bernhard |
| 2007/0198322 A1 | 8/2007 | Bourne et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0267386 A1 | 10/2008 | Cooper |
| 2008/0273687 A1 * | 11/2008 | Knott et al. ............... 379/266.01 |
| 2009/0043670 A1 * | 2/2009 | Johansson et al. ............... 705/26 |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0234710 A1 | 9/2009 | Belgaied Hassine et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054452 A1 | 3/2010 | Afzal |
| 2010/0054453 A1 | 3/2010 | Stewart |
| 2010/0111288 A1 | 5/2010 | Afzal et al. |
| 2010/0183138 A1 | 7/2010 | Spottiswoode et al. |
| 2011/0022357 A1 | 1/2011 | Vock et al. |
| 2011/0069821 A1 | 3/2011 | Korolev et al. |
| 2011/0125048 A1 | 5/2011 | Causevic et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |

FOREIGN PATENT DOCUMENTS

| | | |
|---|---|---|
| EP | 1 032 188 A | 8/2000 |
| JP | 2000-078292 | 3/2000 |
| JP | 2000-092213 | 3/2000 |
| JP | 2000-236393 | 8/2000 |
| JP | 2001-292236 | 10/2001 |
| JP | 2001-518753 | 10/2001 |
| JP | 2002-297900 | 10/2002 |
| JP | 3366565 | 1/2003 |
| JP | 2004-227228 | 8/2004 |

(56) References Cited

FOREIGN PATENT DOCUMENTS

| | | |
|---|---|---|
| JP | 2007-324708 | 12/2007 |
| WO | WO-99/17517 | 4/1999 |
| WO | WO-01/63894 A2 | 8/2001 |
| WO | WO-01/63894 A3 | 8/2001 |
| WO | WO-2006/124113 A2 | 11/2006 |
| WO | WO 2010/053701 | 5/2010 |
| WO | WO-2011/081514 | 7/2011 |

OTHER PUBLICATIONS

International Search Report mailed on Mar. 12, 2010, for PCT Application No. PCT/US/2009/054352, filed on Aug. 19, 2009, 5 pages.
Written Opinion mailed on Feb. 24, 2010, for PCT Application No. PCT/US2009/066254, filed on Dec. 1, 2009, 6 pages.
Written Opinion mailed on Mar. 12, 2010, for PCT Application No. PCT/US/2009/054352, filed on Aug. 19, 2009, 6 pages.
International Search Report mailed on Mar. 13, 2009, for PCT Application No. PCT/US2008/077042, filed on Sep. 19, 2008, 6 pages.
International Search Report mailed on Jun. 3, 2009, for PCT Application No. PCT/US2009/031611, filed on Jan. 21, 2009, 8 pages.
Written Opinion mailed on Mar. 13, 2009, for PCT Application No. PCT/US2008/077042, filed on Sep. 19, 2008, 6 pages.
Written Opinion mailed on Jun. 3, 2009, for PCT Application No. PCT/US2009/031611, filed on Jan. 21, 2009, 8 pages.
Anonymous. (2006). "Performance Based Routing in Profit Call Centers," *The Decision Makers' Direct*, located at www.decisioncraft.com, Issue Dec. 6, 2001, three pages.
Gans, N. et al. (2003). "Telephone Call Centers: Tutorial, Review and Research Prospects," Manuscript, pp. 1-81.
Koole, G. (2004). "Performance Analysis and Optimization in Customer Contact Centers," *Proceedings of the Quantitative Evaluation of Systems*, First International Conference, Sep. 27-30, 2004, four pages.
Koole, G. et al. (Mar. 6, 2006). "An Overview of Routing and Staffing Algorithms in Multi-Skill Customer Contact Centers," Manuscript, 42 pages.
Riedmiller, M. et al. (1993). "A Direct Adaptive Method for Faster Backpropagation Learning: The RPROP Algorithm," *1993 IEEE International Conference on Neural Networks*, San Francisco, CA, Mar. 28-Apr. 1, 1993, 1:586-591.
Notice of Allowance dated Jun. 29, 2012 issued in connection with U.S. Appl. No. 12/355,618.
Office Action dated Sep. 26, 2011 issued in connection with U.S. Appl. No. 12/355,618.
Office Action dated Feb. 3, 2012 issued in connection with U.S. Appl. No. 12/202,097.
Office Action dated Aug. 19, 2011 issued in connection with U.S. Appl. No. 12/202,097.
Office Action dated Feb. 3, 2012 issued in connection with U.S. Appl. No. 12/202,091.
U.S. Appl. No. 12/266,415, filed Nov. 6, 2008, Afzal et al.
U.S. Appl. No. 12/266,418, filed Nov. 6, 2008, Xie et al.
U.S. Appl. No. 12/266,446, filed Nov. 6, 2008, Chishti.
U.S. Appl. No. 12/266,461, filed Nov. 6, 2008, Chishti.
U.S. Appl. No. 12/331,153, filed Dec. 9, 2008, Spottiswoode et al.
U.S. Appl. No. 12/355,602, filed Jan. 16, 2009, Xie et al.
U.S. Appl. No. 12/869,645, filed Aug. 26, 2010, Chishti et al.
U.S. Appl. No. 12/869,654, filed Aug. 26, 2010, Chishti et al.
U.S. Appl. No. 13/221,692, filed Aug. 30, 2011, Spottiswoode et al.
Office Action dated Sep. 6, 2011 issued in connection with U.S. Appl. No. 12/202,091.
Office Action dated Oct. 7, 2011 issued in connection with U.S. Appl. No. 12/331,210.
Office Action dated Apr. 16, 2012 issued in connection with U.S. Appl. No. 12/331,210.
Office Action dated Apr. 18, 2012 issued in connection with U.S. Appl. No. 12/266,418.
Office Action dated Sep. 15, 2011 issued in connection with U.S. Appl. No. 12/266,418.
Office Action dated Oct. 29, 2012 issued in connection with U.S. Appl. No. 12/490,949.
Office Action dated Mar. 19, 2012 issued in connection with U.S. Appl. No. 12/490,949.
Office Action dated May 11, 2012 issued in connection with U.S. Appl. No. 12/331,195.
Office Action dated Oct. 7, 2011 issued in connection with U.S. Appl. No. 12/331,195.
Office Action dated Jan. 23, 2012 issued in connection with U.S. Appl. No. 12/331,186.
Office Action dated Aug. 19, 2011 issued in connection with U.S. Appl. No. 12/331,186.
Office Action dated Oct. 11, 2012 issued in connection with U.S. Appl. No. 12/267,459.
Office Action dated Mar. 2, 2012 issued in connection with U.S. Appl. No. 12/267,459.
Office Action dated Aug. 4, 2011 issued in connection with U.S. Appl. No. 12/267,459.
Office Action dated Mar. 30, 2012 issued in connection with U.S. Appl. No. 12/267,471.
Office Action dated Jun. 8, 2012 issued in connection with U.S. Appl. No. 12/266,446.
Office Action dated Sep. 12, 2011 issued in connection with U.S. Appl. No. 12/266,446.
Office Action dated Jun. 29, 2012 issued in connection with U.S. Appl. No. 12/331,153.
Office Action dated Sep. 26, 2011 issued in connection with U.S. Appl. No. 12/331,153.
Office Action dated Oct. 9, 2012 issued in connection with U.S. Appl. No. 12/202,101.
Office Action dated Mar. 15, 2012 issued in connection with U.S. Appl. No. 12/202,101.
Office Action dated Aug. 9, 2011 issued in connection with U.S. Appl. No. 12/202,101.
Office Action dated Jun. 7, 2012 issued in connection with U.S. Appl. No. 12/355,602.
Office Action dated Sep. 23, 2011 issued in connection with U.S. Appl. No. 12/355,602.
Office Action dated Apr. 6, 2012 issued in connection with U.S. Appl. No. 12/021,251.
Office Action dated Sep. 19, 2011 issued in connection with U.S. Appl. No. 12/021,251.
Notice of Allowance dated Sep. 19, 2012 issued in connection with U.S. Appl. No. 12/180,382.
Office Action dated Mar. 1, 2012 issued in connection with U.S. Appl. No. 12/180,382.
Office Action dated Aug. 23, 2011 issued in connection with U.S. Appl. No. 12/180,382.
Office Action dated Jun. 18, 2012 issued in connection with U.S. Appl. No. 12/331,201.
Office Action dated May 11, 2012 issued in connection with U.S. Appl. No. 12/266,415.
Office Action dated Jan. 19, 2012 issued in connection with U.S. Appl. No. 12/266,415.
International Search Report mailed Jul. 6, 2010 issued in connection with PCT/US2009/061537.
Written Opinion mailed Jul. 6, 2010 issued in connection with PCT/US2009/061537.
Office Action dated Jan. 15, 2013 issued in connection with U.S. Appl. No. 12/267,471.
Office Action dated Jan. 3, 2013 issued in connection with U.S. Appl. No. 12/331,210.
Office Action dated Nov. 1, 2012 issued in connection with Chinese Application No. 20088012833.6, with English translation.
Office Action dated Nov. 1, 2012 issued in connection with Mexican Application No. MX/a/2010/008238.
Office Action dated Nov. 1, 2012 issued in connection with Mexican Application No. MX/a/2011/002272.
Office Action dated Jan. 8, 2013 issued in connection with Australian Patent Application No. 2008349500.
Office Action dated Jan. 8, 2013 issued in connection with Australian Patent Application No. 2009209317.
U.S. Appl. No. 13/715,765, filed Dec. 14, 2012, Zia Chishti et al.

(56) References Cited

OTHER PUBLICATIONS

U.S. Appl. No. 13/843,541, filed Mar. 15, 2013, Zia Chisti et al.
U.S. Appl. No. 13/843,724, filed Mar. 15, 2013, Spottiswoode et al.
U.S. Appl. No. 13/843,807, filed Mar. 15, 2013, Spottiswoode et al.
U.S. Appl. No. 13/854,825, filed Apr. 1, 2013, Zia Chisti et al.
Notice of Allowance dated Feb. 28, 2013 issued in connection with U.S. Appl. No. 12/331,201.
Office Action dated Jan. 30, 2013 issued in connection with Chinese Application No. 20098011060.8, with English translation.
Office Action dated Feb. 21, 2013 issued in connection with Japanese Patent Application No. 2010-544292.
International Search Report dated Jun. 14, 2013 issued in connection with PCT/US2013/033261.
International Search Report dated May 31, 2013 issued in connection with International Application No. PCT/US 13/33268.
Notice of Allowance dated Apr. 11, 2013 issued in connection with U.S. Appl. No. 12/869,654.
Notice of Allowance dated Apr. 10, 2013 issued in connection with U.S. Appl. No. 12/266,461.
Ntzoufras, "Bayesian Modeling Using Winbugs". Wiley Interscience, Oct. 18, 2007.
Office Action dated Jan. 31, 2013 issued in connection with U.S. Appl. No. 12/331,161.
Office Action dated Dec. 13, 2012 issued in connection with U.S. Appl. No. 12/355,602.
Office Action dated Dec. 28, 2012 issued in connection with U.S. Appl. No. 12/266,461.
Office Action dated Dec. 31, 2012 issued in connection with U.S. Appl. No. 12/869,645.
Office Action dated Dec. 31, 2012 issued in connection with U.S. Appl. No. 12/869,654.
Office Action dated Mar. 28, 2013 issued in connection with U.S. Appl. No. 13/221,692.
Office Action dated Jun. 27, 2013 issued in connection with U.S. Appl. No. 12/869,645.
Office Action dated Aug. 31, 2012 issued in connection with Mexican Patent Application No. MX/a/2011/004815.
Office Action dated Jun. 7, 2013 issued in connection with Japanese Patent Application No. 2010-544399.
Office Action dated Mar. 20, 2013 issued in connection with U.S. Appl. No. 12/331,153.
Office Action dated May 21, 2013 issued in connection with U.S. Appl. No. 12/267,459.
Office Action mailed Apr. 24, 2013 issued in connection with Mexican Patent Application No. MX/a/2011/004815.
Written Opinion dated Jun. 14, 2013 issued in connection with PCT/US2013/033261.
Written Opinion dated May 31, 2013 issued in connection with International Application No. PCT/US13/33268.
International Search Report mailed Jul. 9, 2013 issued in connection with PCT/US2013/33265.
Notice of Allowance dated Oct. 4, 2013 issued in connection with U.S. Appl. No. 12/202,101.
Notice of Allowance dated Sep. 18, 2013 issued in connection with U.S. Appl. No. 12/331,153.
Notice of Allowance dated Sep. 5, 2013 issued in connection with U.S. Appl. No. 12/331,161.
Notice of Allowance mailed Jul. 8, 2013, issued in connection with U.S. Appl. No. 13/843,541.
Notification of Transmittal of the International Search Report and the Written Opinion of the International Searching Authority, or the Declaration mailed Jul. 9, 2013 issued in connection with PCT/US2013/33265.
Office Action dated Oct. 21, 2013 issued in connection with U.S. Appl. No. 12/331,210.
Office Action dated Jul. 5, 2013 issued in connection with Mexican Application No. MX/a/2011/002272.
Office Action dated Jul. 9, 2013 issued in connection with Chinese Application No. 200980142771.1, with English translation.
Office Action dated Aug. 13, 2013 issued in connection with U.S. Appl. No. 13/854,825.
Office Action dated Aug. 28, 2013 issued in connection with Chinese Application No. 200980153730.2, with English translation.
Office Action dated Sep. 23, 2013 issued in connection with U.S. Appl. No. 12/331,186.
Office Action dated Sep. 24, 2013 issued in connection with U.S. Appl. No. 12/202,097.
Office Action mailed Jul. 2, 2013 in connection with Mexican Application No. MX/a/2010/008238.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Third Office Action dated Aug. 29, 2013 issued in connection with Chinese Application No. 2008801283369.
Written Opinion of the International Searching Authority mailed Jul. 9, 2013 issued in connection with PCT/US2013/33265.
Notice of Reasons for Rejection mailed Dec. 20, 2013 issued in connection with Japanese Application No. 2010-544399 with English translation.
Mexican Office Action mailed Dec. 17, 2013 issued in connection with Application No. MX/a/2010/008238.
Notice of Allowance mailed Nov. 18, 2013 issued in connection with U.S. Appl. No. 13/854,825.
Notice of Allowance mailed Dec. 23, 2013 issued in connection with U.S. Appl. No. 12/869,654.
Notice of Allowance Office Action dated mailed Dec. 26, 2013 U.S. Appl. No. 12/869,645.
Office Action dated Nov. 5, 2013 issued in connection with U.S. Appl. No. 13/715,765.
Office Action dated Dec. 17, 2013 issued in connection with U.S. Appl. No. 12/331,195.
Office Action dated Nov. 6, 2013 issued in connection with U.S. Appl. No. 13/221,692.
Office Action mailed Nov. 5, 2013 issued in connection with U.S. Appl. No. 12/267,471.
Office Action mailed Dec. 10, 2013 issued in connection with U.S. Appl. No. 14/032,657.
Office Action mailed Oct. 22, 2013 issued in connection with Japanese Application No. 2011-525099.

* cited by examiner

JUMPING CALLERS HELD IN QUEUE FOR A CALL CENTER ROUTING SYSTEM

CROSS REFERENCE TO RELATED APPLICATIONS

This application is a continuation-in-part of U.S. Ser. No. 12/021,251, filed Jan. 28, 2008, and a continuation-in-part of U.S. Ser. No. 12/266,418, filed Nov. 6, 2008, both of which are hereby incorporated by reference in its entirety for all purposes, and further claims benefit to provisional application U.S. Ser. No. 61/084,201, filed Jul. 28, 2008, which is hereby incorporated by reference in its entirety for all purposes.

BACKGROUND

1. Field

The present invention relates to the field of routing phone calls and other telecommunications in a contact center system.

2. Related Art

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents using a telecommunication device are referred to in this application as a "caller." The individuals acquired by the contact center to interact with callers are referred to in this application as an "agent."

Conventionally, a contact center operation includes a switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Routing technologies have accordingly been developed to optimize the caller experience. For example, U.S. Pat. No. 7,236,584 describes a telephone system for equalizing caller waiting times across multiple telephone switches, regardless of the general variations in performance that may exist among those switches. Contact routing in an inbound contact center, however, is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

Some attempts have been made to improve upon these standard yet essentially random processes for connecting a caller to an agent. For example, U.S. Pat. No. 7,209,549 describes a telephone routing system wherein an incoming caller's language preference is collected and used to route their telephone call to a particular contact center or agent that can provide service in that language. In this manner, language preference is the primary driver of matching and connecting a caller to an agent, although once such a preference has been made, callers are almost always routed in "round-robin" fashion. Other attempts have been made to alter the general round-robin system. For example, U.S. Pat. No. 7,231,032 describes a telephone system wherein the agents themselves each create personal routing rules for incoming callers, allowing each agent to customize the types of callers that are routed to them. These rules can include a list of particular callers the agent wants routed to them, such as callers that the agent has interacted with before. This system, however, is skewed towards the agent's preference and does not take into account the relative capabilities of the agents nor the individual characteristics of the callers and the agents themselves.

BRIEF SUMMARY

According to one example of the present invention, methods and systems for a call center include identifying caller data for a caller in a queue of callers, and jumping or moving the caller to a different position within the queue based on the caller data. The caller data may include one or both of demographic data and psychographic data. The caller can be jumped forward or backward in the queue relative to at least one other caller. Jumping the caller may further be based on comparing the caller data with agent data associated with an agent via a pattern matching algorithm such as a correlation algorithm.

In another example, methods and systems include routing a caller from a queue of callers out of order. In one example, a method includes identifying caller data for a caller of a plurality of callers in the queue, and routing the caller from the queue out of queue order based on the identified data. For example, a caller that is not at the top of the queue may be routed from the queue based on the identified caller data, out of order with respect to the queue order. The caller may be routed to another queue of callers, a pool of callers, or an agent based on the identified caller data, where the caller data may include one or both of demographic and psychographic data. The caller may be routed from the queue based on comparing the caller data with agent data associated with an agent via a pattern matching algorithm or computer model.

In another example, methods and systems include routing a caller from a pool of callers based on at least one caller data associated with the caller, where a pool of callers includes, e.g., a set of callers that are not chronologically ordered and routed based on a chronological order or hold time of the callers. The caller may be routed from the pool of callers to an agent, placed in another pool of callers, or placed in a queue of callers. The caller data may include demographic or psychographic data. The caller may be routed from the pool of callers based on comparing the caller data with agent data associated with an agent via a pattern matching algorithm or computer model.

In another example, methods and systems include pooling incoming callers, and causing a caller from the pool of callers to be routed. The caller may be routed from the pool of callers to an agent, placed in another pool of callers, or placed in a queue of callers. The caller may be routed based on identified caller data, which may include demographic or psychographic data. The caller may be routed from the pool of callers based on comparing the caller data with agent data associated with an agent via a pattern matching algorithm or computer model.

In another example, methods and systems include identifying caller data for a caller of a set of callers, wherein the caller data comprises demographic or physiographic data, and causing a caller of the set of callers to be routed based on the identified caller data. The caller may be routed from the set of callers based on comparing the caller data with agent data associated with an agent via a pattern matching algorithm or computer model. The set of callers may include a queue of callers and the caller may be routed to a new position within the queue of callers, a different queue of callers, a pool of callers, or to an agent. Alternatively, the set of callers may include a pool of callers and the caller may be routed to a different pool of callers, a queue of callers, or to an agent.

It is noted for comparison with the examples provided that conventional routing systems may include one or more queues (e.g., based on language, preferred account status, or the like), but are typically set-up to route and connect an available agent with the next caller in the queue. Further, it is noted that conventional routing systems typically determine up front, in a time-linear basis, whether a customer needs a language specific agent (e.g., Spanish) or is a preferred status customer, and then assigns them into an appropriate queue of callers on that basis. Conventional routing systems, however, do not pull callers from a queue out of order or jump callers within a queue. Further, conventional routing systems do not pool callers as described or match callers from a pool for routing to an agent as described.

In some examples, the methods and systems may further include comparing data associated with at least one of the callers to data associated with the available agent. In some examples, the caller data and agent data may be compared via a pattern matching algorithm and/or computer model for predicting the caller-agent pair having the highest probability of a desired outcome. In one example, a caller is routed from a queue of callers or a pool of callers based on a metric, e.g., a pattern matching suitability score, without relying solely or primarily on the caller's wait time or position within a queue. For instance, a caller may be connected with an agent before other callers in the pool or queue that have been waiting for a longer period of time based, at least in part, on a pattern matching algorithm.

In some examples, a hold threshold for one or more of the callers in the pool may be included as a factor, e.g., as a weighting factor used with other data in the pattern matching algorithm or trigger to route a caller. The hold threshold may include a predetermined time, a multiple of an average or expected hold time for the caller when the call arrives, the number of callers routed while they are on hold, e.g., how many times they have been "skipped" by other callers, and so on. For example, a caller may be assigned a hold threshold (e.g., seconds, minutes, or number of times they are "skipped"), which if exceeded, overrides the pattern matching algorithm, e.g., to prevent a caller from being held indefinitely. Further, each caller may be individually assigned a hold threshold, e.g., based on data associated with the caller, such as their inclination to generate revenue or preferred account status, or all callers may be given a common hold threshold.

In one example, a "cost" or "pain" function is applied to callers in the queue or pool to analyze the varying chance of a successful interaction as callers wait in the queue or pool of callers. The pattern matching algorithm or computer model may use the cost function in mapping callers to agents. For instance, consider an example where the best matching agent for a caller might be occupied and have a 70% chance of increased revenue generation for a caller, but is not expected to be free soon (e.g., is only a few seconds into another call). The next best matching agent is free and has a 95% chance of increased revenue generation for the caller. The cost function may indicate that the system route the caller to the next best agent because the 70% chance of increased revenue generation for the caller will decrease over time, most likely below 95% by the time the best agent is free.

In other examples, preferred callers (e.g., preferred account members, platinum/gold service levels, and so on) may be used to multiply a matching score by some "platinum" factor to accelerate connection time for such preferred callers, or to jump them within a queue of callers. In other examples, preferred callers may by included with different queues or pools for faster service.

Additionally, in one example, one or more hold thresholds may be adjustable and controlled by a user, e.g., in real-time via a displayed user interface. For instance, a user may be able to adjust the allowed hold time for a caller, or adjust the weighting of a cost function as used by the system. Furthermore, in some examples, the system may analyze and display an estimated effect on one or more output performance variables of the system in response to adjusting or setting a hold threshold. For instance, increasing the time a caller may be held may increase a certain output variable (e.g., revenue), but decrease another output variable (e.g., customer satisfaction). Accordingly, some examples allow a user to adjust and view estimated performance effects based on the hold threshold(s).

Various performance based and/or pattern matching algorithms for matching callers and agents based on available information regarding each may be utilized. In general, contact center routings are potentially improved or optimized by routing contacts such that callers are matched with and connected to particular agents in a manner that increases the chance of an interaction that is deemed beneficial to a contact center (referred to in this application as an "optimal interaction"). Examples of optimal interactions include increasing sales, decreasing the duration of the contact (and hence the cost to the contact center), providing for an acceptable level of customer satisfaction, or any other interaction that a contact center may seek to control or improve. The exemplary systems and methods can improve the chance of an optimal interaction by, in general, grading agents on an optimal interaction, and matching a graded agent with a caller to increase the chance of the optimal interaction. Once matched, the caller can be connected to the graded agent. In a more advanced embodiment, the systems and methods can also be used to increase the chance of an optimal interaction by matching a caller to an agent using a computer model derived from data describing demographic, geographic, psychographic, past purchase behavior, personality characteristics (e.g., via a Myers-Brigg Type Indicator test or the like), time effects (e.g., data associated with different times of the day, week, month, etc.) or other relevant information about a caller, together with data describing demographic, geographic, psychographic, personality characteristics, time effects, or historical performance about an agent.

In another example, exemplary systems and methods can be used to increase the chances of an optimal interaction by combining agent grades (e.g., a grade or rank of the agent performance), agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences.

Caller demographic and psychographic data can be retrieved from available databases by using the caller's contact information as an index. Available databases include, but are not limited to, those that are publicly available, those that are commercially available, or those created by a contact center or a contact center client. In an outbound contact center environment, the caller's contact information is known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

Once agent data and caller data have been collected, this data may be passed to a computational system. The computational system then, in turn, uses this data in a pattern matching algorithm to create a computer model that matches each agent with each caller and estimates the probable outcome of each matching along a number of optimal interactions, such as the generation of a sale, the duration of contact, or the likelihood of generating an interaction that a customer finds satisfying. As an example, the systems and methods may indicate that, by matching a caller to a female agent, the matching will increase the probability of a sale by 4 percent, reduce the duration of a contact by 9 percent, and increase the satisfaction of the caller with the interaction by 12 percent. Generally, the systems and methods will generate more complex predictions spanning multiple demographic and psychographic aspects of agents and callers. Exemplary systems and methods might conclude, for instance, that a caller if connected to a single, white, male, 25 year old, agent that has high speed internet in his home and enjoys comedic films will result in a 12 percent increase in the probability of a sale, a 7 percent increase in the duration of the contact, and a 2 percent decrease in the caller's satisfaction with the contact. In parallel, the exemplary systems and methods may also determine that the caller if connected to a married, black, female, 55 year old agent will result in a 4 percent increase in the probability of a sale, a 9 percent decrease in the duration of a contact, and a 9 percent increase in the caller's satisfaction with the contact.

Though this advanced embodiment preferably uses agent grades, demographic, psychographic, and other business-relevant data, along with caller demographic, psychographic, and other business-relevant data, other embodiments can eliminate one or more types or categories of caller or agent data to minimize the computing power or storage necessary to employ the exemplary methods and systems.

The pattern matching algorithm to be used in the exemplary methods and systems can comprise any correlation algorithm, such as a neural network algorithm or a genetic algorithm. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

The pattern matching algorithm can be used to create a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, the exemplary methods and systems can match every available agent with every available caller, or even a narrower subset of agents or callers. Likewise, the methods and systems can match every agent that ever worked on a particular campaign—whether available or logged in or not—with every available caller. Similarly, the computer model can comprise predicted chances for one optimal interaction or a number of optimal interactions.

The computer model can also be further refined to comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used in the exemplary methods and systems to determine which agents should be connected to which callers.

For example, it may be that the computer model indicates that a caller match with agent one will result in a high chance of a sale with but a high chance of a long contact, while a caller match with agent two will result in a low chance of a sale but a high chance of a short contact. If an optimal interaction for a sale is more heavily weighted than an optimal interaction of low cost, then the suitability scores for agent one as compared to agent two will indicate that the caller should be connected to agent one. If, on the other hand, an optimal interaction for a sale is less weighted than an optimal interaction for a low cost contact, the suitability score for agent two as compared to agent one will indicate that the caller should be connected to agent two.

Another aspect of the exemplary methods and system is that it may develop affinity databases by storing data, the databases comprising data on an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent. The caller affinity data can then be used to refine the matches that can be made using the exemplary methods and systems.

Another aspect of the exemplary methods and systems is that it may develop affinity databases that comprise revenue generation, cost, and customer satisfaction performance data of individual agents as matched with specific caller demographic, psychographic, or other business-relevant characteristics (referred to in this application as "agent affinity data"). An affinity database such as this may, for example, result in the exemplary methods and systems predicting that a specific agent performs best in interactions with callers of a similar age, and less well in interactions with a caller of a significantly older or younger age. Similarly this type of affinity database may result in the exemplary methods and systems predicting that an agent with certain agent affinity data handles callers originating from a particular geography much better than the agent handles callers from other geographies. As another example, exemplary methods and systems may predict that a particular agent performs well in circumstances in which that agent is connected to an irate caller.

Though affinity databases are preferably used in combination with agent data and caller data that pass through a pattern matching algorithm to generate matches, information stored in affinity databases can also be used independently of agent data and caller data such that the affinity information is the only information used to generate matches.

Exemplary methods and systems can also comprise connection rules to define when or how to connect agents that are matched to a caller. The connection rules can be as simple as instructing the method or system to connect a caller according to the best match among all available agents with that particular caller. In this manner, caller hold time can be minimized. The connection rules can also be more involved, such as instructing the method or system to connect a caller only when a minimum threshold match exists between an available agent and a caller, or to allow a defined period of time to search for a minimum matching or the best available matching at that time. The connection rules can also purposefully keep certain agents available while a search takes place for a potentially better match.

In another example, systems and methods include combining multiple output variables of a pattern matching algorithm (for matching callers and agents) into a single metric for use in controlling and managing the routing system. The pattern matching algorithm may include a neural network architecture, where the exemplary methods and systems combine outputs from multiple neural networks, one for each output variable. For example, the system and methods may determine a Z-score (e.g., a dimensionless standard score) for each of two or more variable outputs of a pattern matching algorithm. For example, the output variable may include or be associated with revenue generation, cost, customer satisfaction performance, first call resolution, cancellation (e.g., later cancelation of a sale due to buyer's remorse), or other variable outputs from the pattern matching algorithm of the system. A linear combination of the determined Z-scores may then be computed to provide a single score based on the multiple variables. For instance, a call routing center may combine two or more of the Z-scores for a desired output of the system (e.g., desiring to optimize some mix of the output variables or deciding that one variable is to be weighted more heavily than another variable). The linear combination and single score may then be used by the routing system for routing or matching callers to agents via the pattern matching algorithm, where, for example, the callers and agents may be matched in an attempt to maximize the output value or score of the determined linear combination of Z-scores for difference caller-agent pairs.

Further, in one example, the pattern matching algorithms and Z-scores may be influenced by the length of time a caller has been on hold, e.g., taking into account a pain threshold function of the caller. For instance, the probability of increased revenue, customer satisfaction, and so on may vary based on the wait time a caller is held before routing to an agent. For example, if a caller is held too long based on a hold threshold or cost function for caller wait time, the probability of a predicted outcome may change (e.g., after a certain time on hold the probability of a sale for the particular caller may drop tremendously). As such, the system may route the caller to an otherwise sub-optimum agent match based on the linear combination of Z-scores and output variables. For example, the desired mix of output variables may be set to weight revenue more than cost or customer satisfaction, however, after a pain threshold is reached for a particular caller, the system may route that caller in a fashion more heavily weighting customer satisfaction.

According to another aspect of the exemplary systems and methods described, a visual computer interface and printable reports may be provided to the contact center or their clients to allow them to, in a real-time or a past performance basis, monitor the statistics of agent to caller matches, measure the optimal interactions that are being achieved versus the interactions predicted by the computer model, as well as any other measurements of real time or past performance using the methods described herein. A visual computer interface for changing the weighting on an optimal interaction can also be provided to the contact center or the contact center client, such that they can, as discussed herein, monitor or change the weightings in real time or at a predetermined time in the future.

Many of the techniques described here may be implemented in hardware, firmware, software, or a combination thereof. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

DETAILED DESCRIPTION OF THE INVENTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Initially, exemplary call routing systems and methods utilizing pattern matching algorithms and computer models are described for routing callers to agents. This description is followed by exemplary methods for routing callers from a queue of callers or a pool of callers, and exemplary systems and methods for optimizing a mix of multiple variable outcomes of the pattern matching algorithms and computer models. For example, systems and methods for combining various metrics associated with multiple variable outputs of the algorithms and combining them into a common metric for matching callers to agents, routing callers from queues of callers or pools of callers, or jumping callers within a queue.

Figure 1:
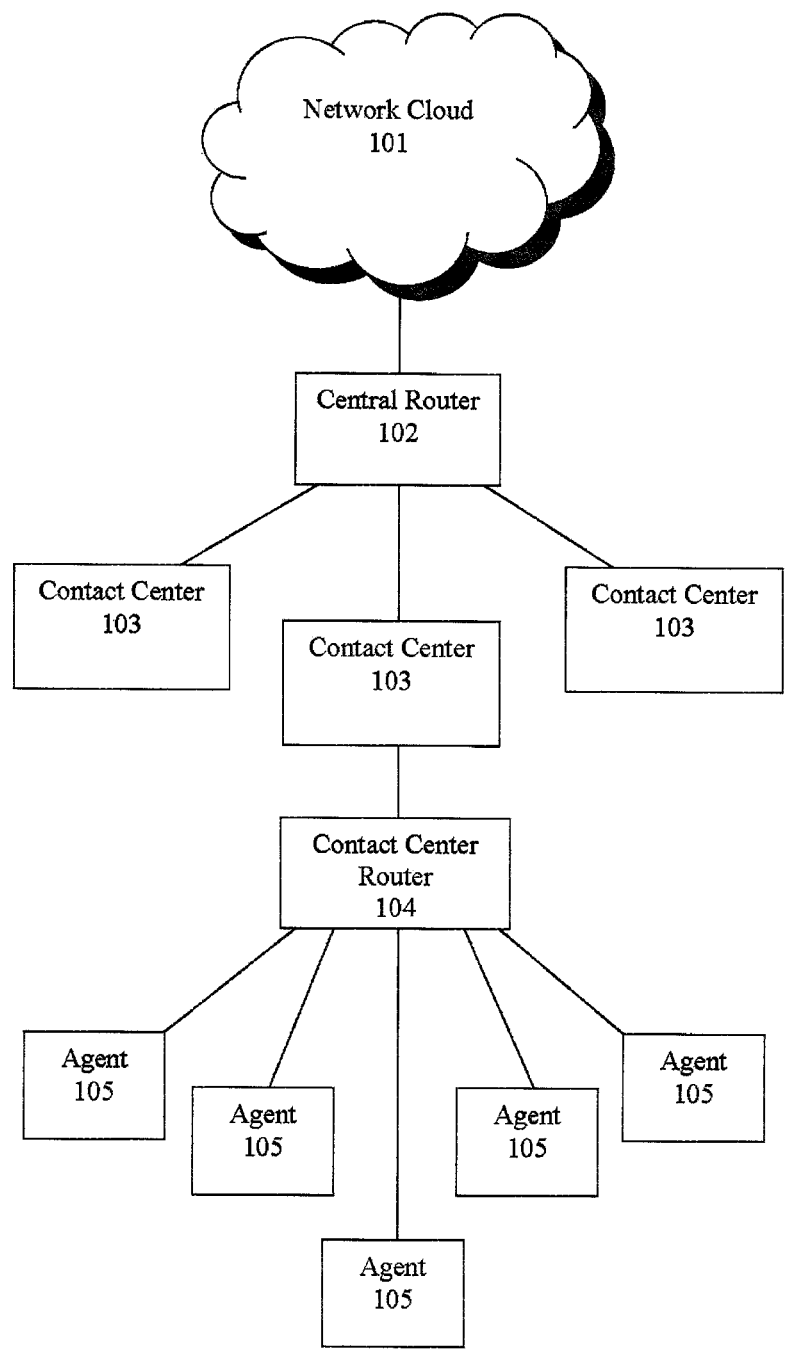
FIG. 1 is a diagram reflecting the general setup of a contact center operation.

FIG. 1 is a diagram reflecting the general setup of a contact center operation 100. The network cloud 101 reflects a specific or regional telecommunications network designed to receive incoming callers or to support contacts made to outgoing callers. The network cloud 101 can comprise a single contact address, such as a telephone number or email address, or multiple contract addresses. The central router 102 reflects contact routing hardware and software designed to help route contacts among call centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105. Typically, there are multiple agents 105 at a contact center 103, though there are certainly embodiments where only one agent 105 is at the contact center 103, in which case a contact center router 104 may prove to be unnecessary.

Figure 2:
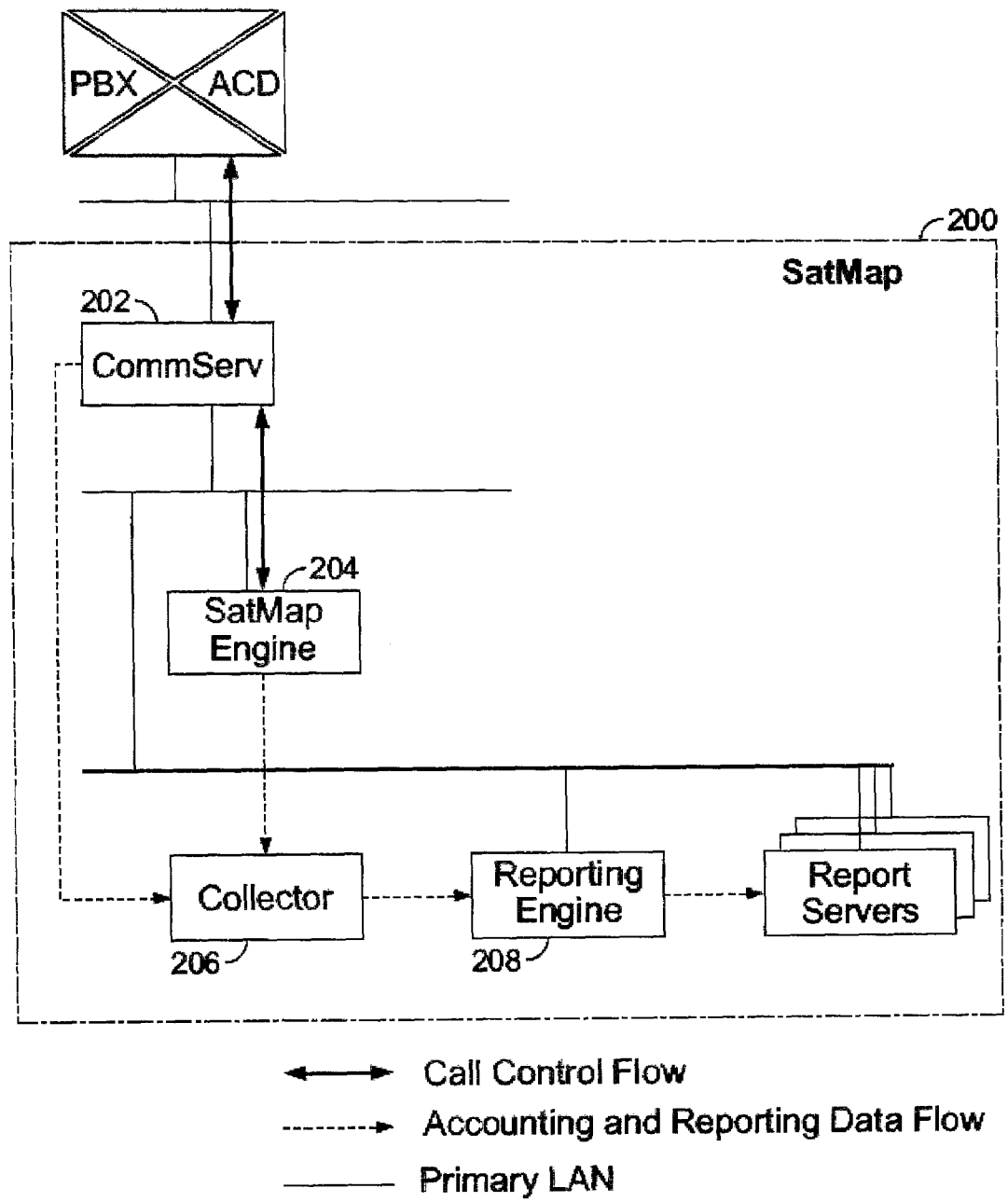
FIG. 2 illustrates an exemplary contact center routing system including a pattern matching engine.

FIG. 2 illustrates an exemplary contact center routing system 200 (which may be included with contact center router 104 of FIG. 1). Broadly speaking, routing system 200 is operable to match callers and agents based, at least in part, on agent performance, pattern matching algorithms or computer models based on caller data and/or agent data, and the like. Routing system 200 may include a communication server 202 and a pattern matching engine 204 (referred to at times as "Satisfaction Mapping" or "SatMap") for receiving and matching incoming callers to agents.

The pattern matching engine 204 may operate in various manners to match callers to agents based on pattern matching algorithms and computer models, which adapt over time based on the performance or outcomes of previous caller-agent matches. In one example, the pattern matching engine 204 includes a neural network based adaptive pattern matching engine, described in greater detail below. Various other exemplary pattern matching and computer model systems and methods may be included with content routing system and/or pattern matching engine 204 are described in U.S. Ser. No. 12/021,251, entitled "Systems and Methods for Routing Callers to an Agent in a Contact Center," and filed Jan. 28, 2008, which is hereby incorporated by reference in its entirety.

Routing system 200 may further include other components such as collector 206 for collecting caller data of incoming callers, data regarding caller-agent pairs, outcomes of caller-agent pairs, agent data of agents, and the like. Further, routing system 200 may include a reporting engine 208 for generating reports of performance and operation of the routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
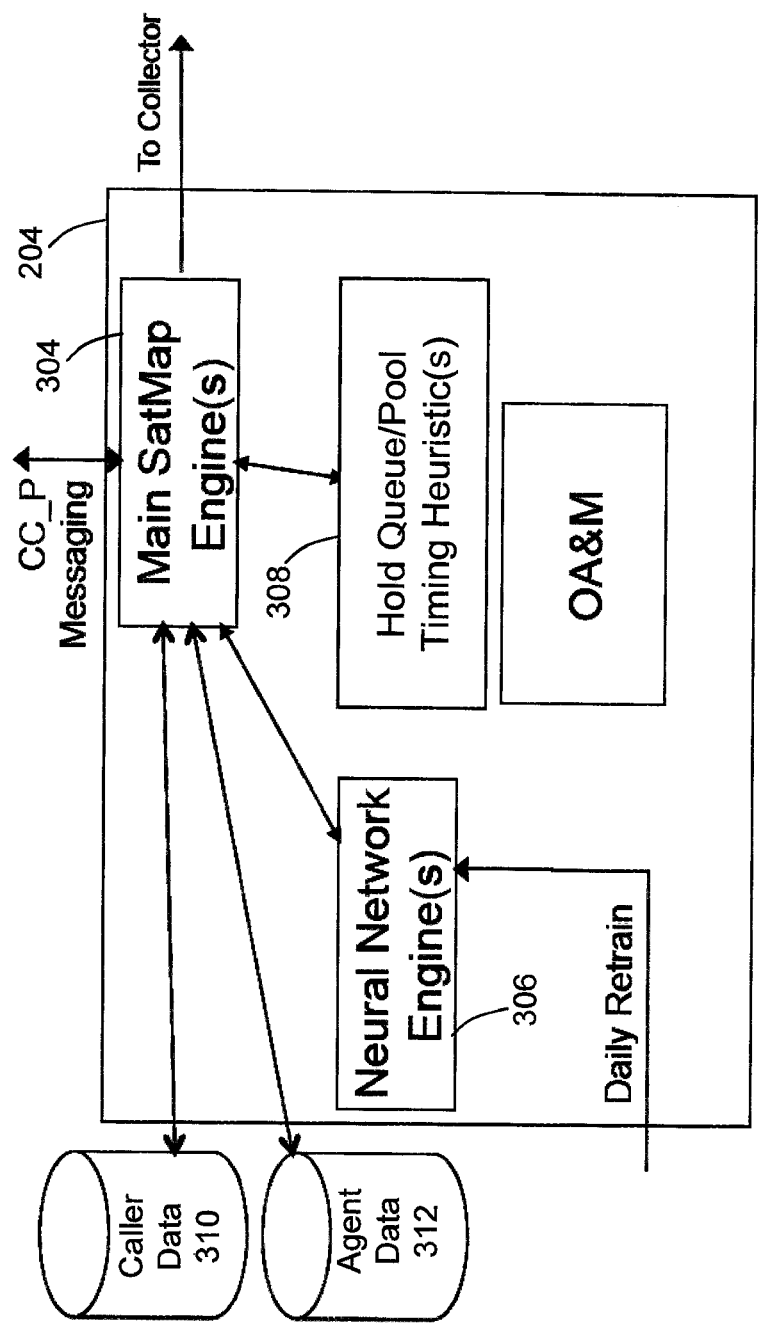
FIG. 3 illustrates an exemplary routing system having a mapping engine for routing callers based on performance and/or pattern matching algorithms.

FIG. 3 illustrates detail of exemplary routing engine 204. Routing engine 204 includes a main mapping engine 304, which receives caller data and agent data from databases 310 and 312. In some examples, routing engine 204 may route callers based solely or in part on performance data associated with agents. In other examples, routing engine 204 may make routing decisions based solely or in part on comparing various caller data and agent data, which may include, e.g., performance based data, demographic data, psychographic data, and other business-relevant data. Additionally, affinity databases (not shown) may be used and such information received by routing engine 204 for making routing decisions.

In one example, routing engine 204 includes or is in communication with one or more neural network engines 306. Neural network engines 306 may receive caller and agent data directly or via routing engine 204 and operate to match and route callers based on pattern matching algorithms and computer models generated to increase the changes of desired outcomes. Further, as indicated in FIG. 3, call history data (including, e.g., caller-agent pair outcomes with respect to cost, revenue, customer satisfaction, etc.) may be used to retrain or modify the neural network engine 306.

Routing engine 204 further includes or is in communication with hold queue/pool logic 308. In one example, hold queue/pool logic 308 operates as a queue for a plurality of callers, for example, storing or accessing hold times, idle times, and/or a queue order of callers and agents, and operates with mapping engine 304 to map callers to agents based on queue order of the callers and/or agents. Mapping engine 304 may operate, for example, to map callers based on a pattern matching algorithm, e.g., as included with neural network engine 306, or based on queue order, e.g., as retrieved from hold queue 308. Further, as described in greater detail below, hold queue/pool logic 308 may operate with one or more of mapping engine 304 and neural network engine 306 to pull callers from the queue out of the queue order for routing to an agent, another queue, or pool of caller. In another example, hold queue/pool logic 308 may operate to pool callers, where callers are pulled from the pool for routing to an agent, another pool, or to a queue of callers without respect to a hold time, idle time, or queue order (e.g., there is no ordered line of callers as in a queue).

The following are various exemplary methods in which the pattern matching engine may operate to route callers from a pool or queue of callers to an available agent, another queue or pool of callers, or to jump a caller within a queue of callers. For example, as described, the pattern matching algorithm may rate agents on performance, compare agent data and caller data and match per a pattern matching algorithm, create computer models to predict outcomes of agent-caller pairs, and the like. It will be appreciated that a content router system may include software, hardware, firmware, or combinations thereof to implement the exemplary methods.

Figures 4, 5:
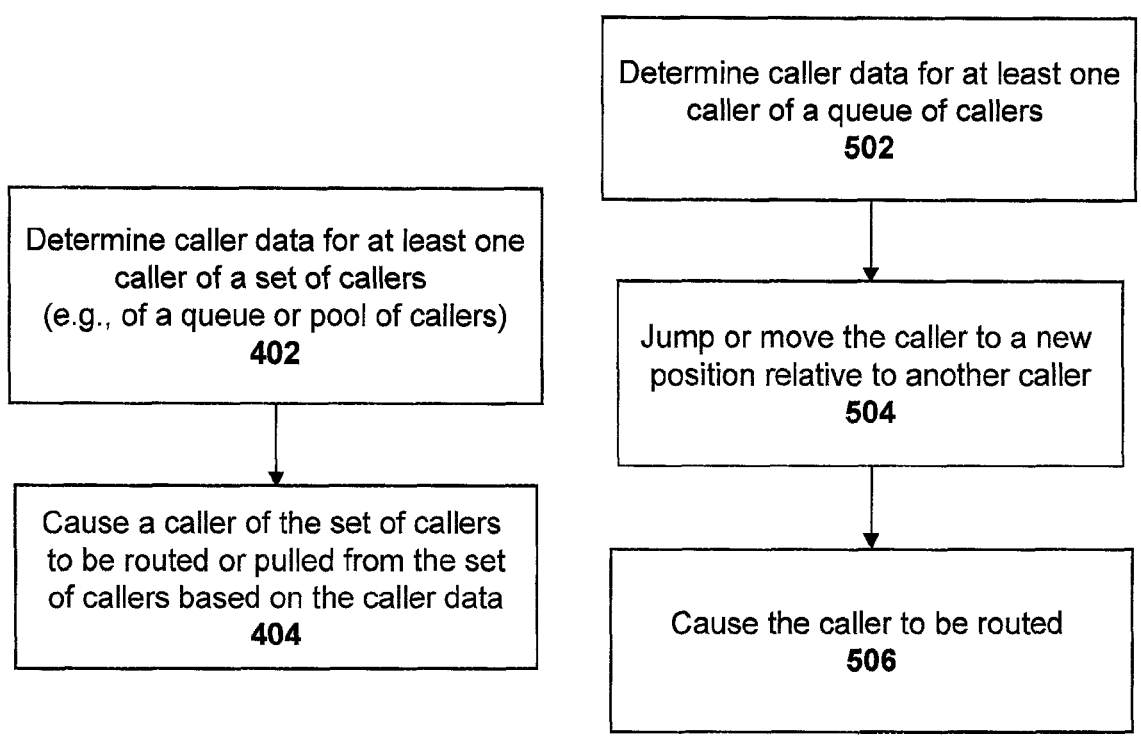
FIG. 4 is a flowchart reflecting an example for matching a caller from a pool of callers to an agent using agent data and caller data.
FIG. 5 is a flowchart reflecting an example for routing a caller from a set of callers.

FIG. 4 illustrates an exemplary method for routing a caller within a call center environment, e.g., by routing system 200. In one example, caller data is determined or identified for at least one caller of a set of callers at 402. The caller data may include demographic, psychographic, and other business-relevant data about callers. The set of callers may include any group of callers such as a queue of callers or a pool of callers (e.g., which may be stored or determined by hold queue/pool logic 308). The caller may be routed from the set of callers at 404 based on the caller data identified in 402 to an agent, another queue of callers, or to a pool of callers. For instance, based on the caller data alone or when compared to agent data via a pattern matching algorithm, computer model, or the like as discussed herein, the caller might be pulled out of a queue or pool of callers and routed to another queue or pool of callers. For example, a caller may be routed to a second queue of callers or a pool of callers, which may be divided or segmented based on particular caller data. Additionally, the caller might be pulled from the set of callers and routed to an available agent, e.g., based on the caller data alone or when compared to agent data via a pattern matching algorithm, computer model, or the like as discussed herein.

FIG. 5 illustrates another exemplary method for routing a caller within a call center environment, e.g., by routing system 200. In this example, caller data is determined or identified for at least one caller of a queue of callers at 502, for example, a chronologically ordered queue of incoming callers. The caller data may include demographic or psychographic data as described herein. The caller may then be moved or jumped at 504 within the queue of callers based on the caller data identified in 502 to a new position within the queue, e.g., jumping ahead (or back) of another caller in the queue order. For instance, based on the caller data alone or when compared to agent data via a pattern matching algorithm, computer model, or the like as discussed herein, the caller might be jumped in the queue ahead of other callers. The caller may be routed to an agent when having the highest priority queue position or otherwise pulled and routed out of queue order as described herein.

Figure 6:
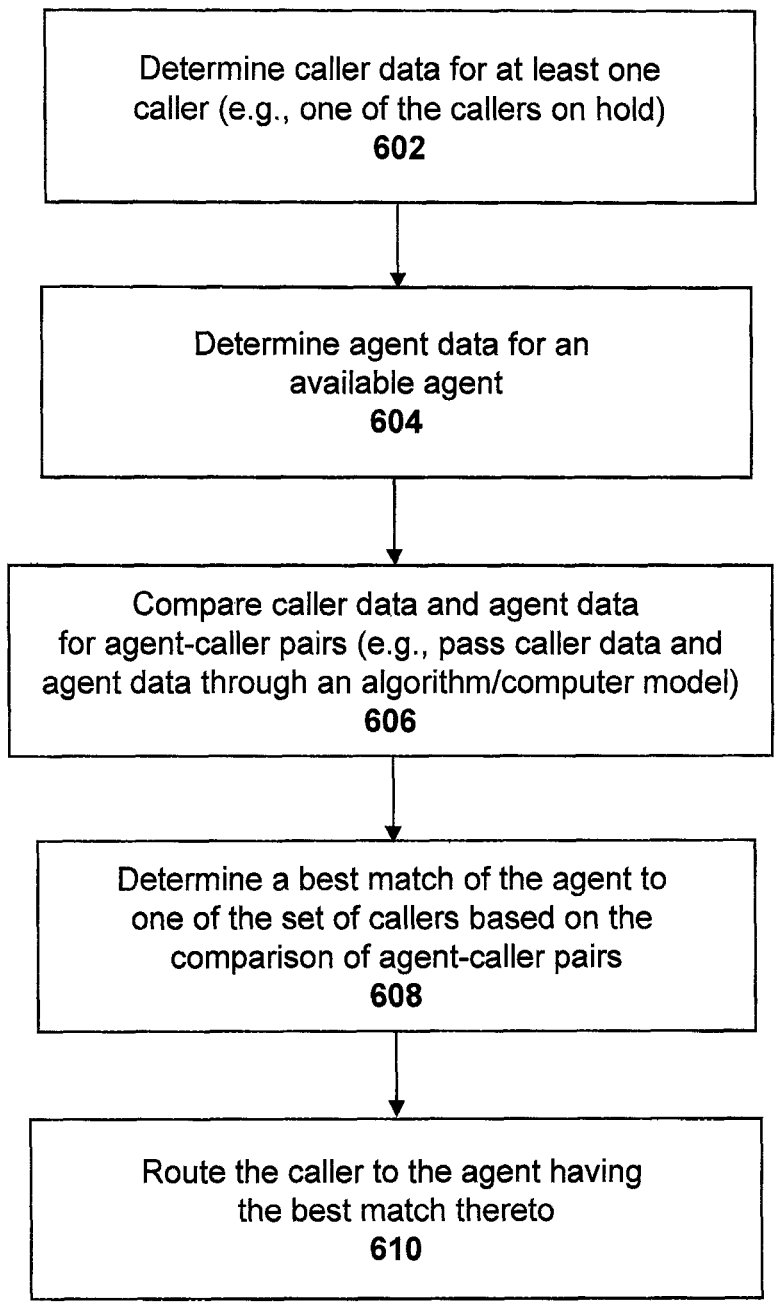
FIG. 6 is a flowchart reflecting an example for jumping a caller within a queue of callers.

FIGS. 6-9 describe various methods for using caller data and/or agent data to make routing decisions, e.g., evaluating caller data and making decision to route callers to agents, other queues or pools of callers, to jump a caller within a queue, and so on. FIG. 6 illustrates an exemplary method for increasing the chances of an optimal interaction by combining agent grades (which may be determined from grading or ranking agents on desired outcomes), agent demographic data, agent psychographic data, and/or other business-relevant data about the agent (individually or collectively referred to in this application as "agent data"), along with demographic, psychographic, and/or other business-relevant data about callers (individually or collectively referred to in this application as "caller data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences.

In one example, a method for operating a contact center includes determining caller data associated with at least one caller of a set of callers (e.g., a pool of callers on hold), determining agent data associated with an agent or agents (e.g., an available agent or agents), comparing the agent data and the caller data (e.g., via a pattern matching algorithm), and matching one of the callers in the pool to the agent to increase the chance of an optimal interaction. In particular, at 602, caller data (such as a caller demographic or psychographic data) is identified or determined for at least one of a set of callers. One way of accomplishing this is by retrieving caller data from available databases by using the caller's contact information as an index. Available databases include, but are not limited to, those that are publicly available, those that are commercially available, or those created by a contact center or a contact center client. In an outbound contact center environment, the caller's contact information is known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

It is typical for a queue of callers on hold to form at a contact center. When a queue has formed it is desirable to minimize the hold time of each caller in order to increase the chances of obtaining customer satisfaction and decreasing the cost of the contact, where cost can be, not only a function of the contact duration, but also a function of the chance that a caller will drop the contact if the wait is too long. Accordingly, in one example, after matching an agent with callers in a queue, for example, the connection rules can thus be configured to comprise an algorithm for queue jumping, whereby a favorable match of a caller on hold and an available agent will result in that caller "jumping" the queue by increasing the caller's connection priority so that the caller is passed to that agent first ahead of others in the chronologically listed queue. The queue jumping algorithm can be further configured to automatically implement a trade-off between the cost associated with keeping callers on hold against the benefit in terms of the chance of an optimal interaction taking place if the caller is jumped up the queue, and jumping callers up the queue to increase the overall chance of an optimal interaction taking place over time at an acceptable or minimum level of cost or chance of customer satisfaction. Callers can also be jumped up a queue if an affinity database indicates that an optimal interaction is particularly likely if the caller is matched with a specific agent that is already available. Additionally, callers can be pulled or routed from the queue to an agent, another queue, or a pool of callers as described herein.

At 604, agent data for one or more agents is identified or determined, e.g., of an available agent. One method of determining agent demographic or psychographic data can involve surveying agents at the time of their employment or periodically throughout their employment. Such a survey process can be manual, such as through a paper or oral survey, or automated with the survey being conducted over a computer system, such as by deployment over a web-browser. Though this advanced embodiment preferably uses agent grades, demographic, psychographic, and other business-relevant data, along with caller demographic, psychographic, and other business-relevant data, other embodiments of the exemplary methods and systems can eliminate one or more types or categories of caller or agent data to minimize the computing power or storage necessary.

The agent data and caller data may then be compared at 606. For instance, the agent data and caller data can be passed to a computational system for comparing caller data to agent data for each agent-caller pair, i.e., the agent data is compared in a pair-wise fashion to each caller on hold. In one example, the comparison is achieved by passing the agent and caller data to a pattern matching algorithm to create a computer model that matches each caller with the agent and estimates the probable outcome of each matching along a number of optimal interactions, such as the generation of a sale, the duration of contact, or the likelihood of generating an interaction that a customer finds satisfying.

Additionally, the amount of time a caller is on hold in the pool of callers may be considered. In one example, a "cost" or "pain" function is applied to callers in the pool to analyze the varying chance of a successful interaction as callers wait in the pool. The pattern matching algorithm or computer model may use the cost function in mapping callers to agents. For instance, consider an example where the best matching agent for a caller might be occupied and have a 70% chance of increased revenue generation for a caller, but is not expected to be free soon (e.g., is only a few seconds into another call). The next best matching agent is free and has a 95% chance of increased revenue generation for the caller. The cost function may indicate that the system route the caller to the next best agent because the 70% chance of increased revenue generation for the caller will decrease over time, most likely below 95% by the time the best agent is free. As such, the pattern matching algorithm or computer model may use the cost function in mapping callers to agents in addition to other caller and agent data.

Additionally, in one example, a hold threshold for one or more of the callers in the pool may be included as a factor, e.g., as a weighting factor used with other data in the pattern matching algorithm or trigger to route a caller. The hold threshold may include a predetermined time, a multiple of an average or expected hold time for the caller when the call arrives, the number of callers routed while they are on hold, e.g., how many times they have been "skipped" by other callers, and so on. For example, a caller may be assigned a hold threshold (e.g., seconds, minutes, or number of times they are "skipped"), which if exceeded, overrides the pattern matching algorithm, e.g., to prevent a caller from being held indefinitely. Further, each caller may be individually assigned a hold threshold, e.g., based on data associated with the caller, such as their inclination to generate revenue or preferred account status, or all callers may be given a common hold threshold.

Exemplary pattern matching algorithms can include any correlation algorithm, such as a neural network algorithm or a genetic algorithm. In one example, a resilient backpropagation (RProp) algorithm may be used, as described by M. Riedmiller, H. Braun: "A Direct Adaptive Method for Faster backpropagation Learning: The RPROP Algorithm," Proc. of the IEEE Intl. Conf. on Neural Networks 1993, which is incorporated by reference herein in its entirety. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

The pattern matching algorithm may create a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, examples can match every available agent with every available caller, or even a narrower subset of agents or callers. Likewise, the present invention can match every agent that ever worked on a particular campaign—whether available or logged in or not—with every available caller. Similarly, the computer model can comprise predicted chances for one optimal interaction or a number of optimal interactions.

A computer model can also comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used in the exemplary methods and systems to determine which agents should be connected to which callers.

Based on the pattern matching algorithm and/or computer model, the method further includes determining the caller having the best match to the agent at 908. As will be understood, the best matching caller may depend on the pattern matching algorithm, computer model, and desired output variables and weightings selected by a particular call center. The determined best match caller is then routed to the agent at 910.

Caller data and agent data may further comprise affinity data. As such, exemplary methods and systems can also comprise affinity databases, the databases comprising data on an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

The caller affinity data can then be used to refine the matches that can be made using the exemplary methods and systems. As an example, a certain caller may be identified by their caller affinity data as one highly likely to make a purchase, because in the last several instances in which the caller was contacted, the caller elected to purchase a product or service. This purchase history can then be used to appropriately refine matches such that the caller is preferentially matched with an agent deemed suitable for the caller to increase the chances of an optimal interaction. Using this embodiment, a contact center could preferentially match the caller with an agent who does not have a high grade for generating revenue or who would not otherwise be an acceptable match, because the chance of a sale is still likely given the caller's past purchase behavior. This strategy for matching would leave available other agents who could have otherwise been occupied with a contact interaction with the caller. Alternatively, the contact center may instead seek to guarantee that the caller is matched with an agent with a high grade for generating revenue, irrespective of what the matches generated using caller data and agent demographic or psychographic data may indicate.

A more advanced affinity database includes one in which a caller's contact outcomes are tracked across the various agent data. Such an analysis might indicate, for example, that the caller is most likely to be satisfied with a contact if they are matched to an agent of similar gender, race, age, or even with a specific agent. Using this embodiment, a system or method could preferentially match a caller with a specific agent or type of agent that is known from the caller affinity data to have generated an acceptable optimal interaction.

Affinity databases can provide particularly actionable information about a caller when commercial, client, or publicly-available database sources may lack information about the caller. This database development can also be used to further enhance contact routing and agent-to-caller matching even in the event that there is available data on the caller, as it may drive the conclusion that the individual caller's contact outcomes may vary from what the commercial databases might imply. As an example, if a system or method were to rely solely on commercial databases in order to match a caller and agent, it may predict that the caller would be best matched to an agent of the same gender to achieve optimal customer satisfaction. However, by including affinity database information developed from prior interactions with the caller, exemplary methods and systems might more accurately predict that the caller would be best matched to an agent of the opposite gender to achieve optimal customer satisfaction.

Another aspect of the exemplary methods and system is that it may develop affinity databases that comprise revenue generation, cost, and customer satisfaction performance data of individual agents as matched with specific caller demographic, psychographic, or other business-relevant characteristics (referred to in this application as "agent affinity data"). An affinity database such as this may, for example, result in the exemplary methods and systems predicting that a specific agent performs best in interactions with callers of a similar age, and less well in interactions with a caller of a significantly older or younger age. Similarly this type of affinity database may result in the examples predicting that an agent with certain agent affinity data handles callers originating from a particular geography much better than the agent handles callers from other geographies. As another example, the system or method may predict that a particular agent performs well in circumstances in which that agent is connected to an irate caller.

Though affinity databases are preferably used in combination with agent data and caller data that pass through a pattern matching algorithm to generate matches, information stored in affinity databases can also be used independently of agent data and caller data such that the affinity information is the only information used to generate matches.

The exemplary systems and methods may store data specific to each routed caller for subsequent analysis. For example, the systems and methods can store data generated in any computer model, including the chances for an optimal interaction as predicted by the computer model, such as the chances of sales, contact durations, customer satisfaction, or other parameters. Such a store may include actual data for the caller connection that was made, including the agent and caller data, whether a sale occurred, the duration of the contact, and the level of customer satisfaction. Such a store may also include actual data for the agent to caller matches that were made, as well as how, which, and when matches were considered pursuant to connection rules and prior to connection to a particular agent.

Figure 7:
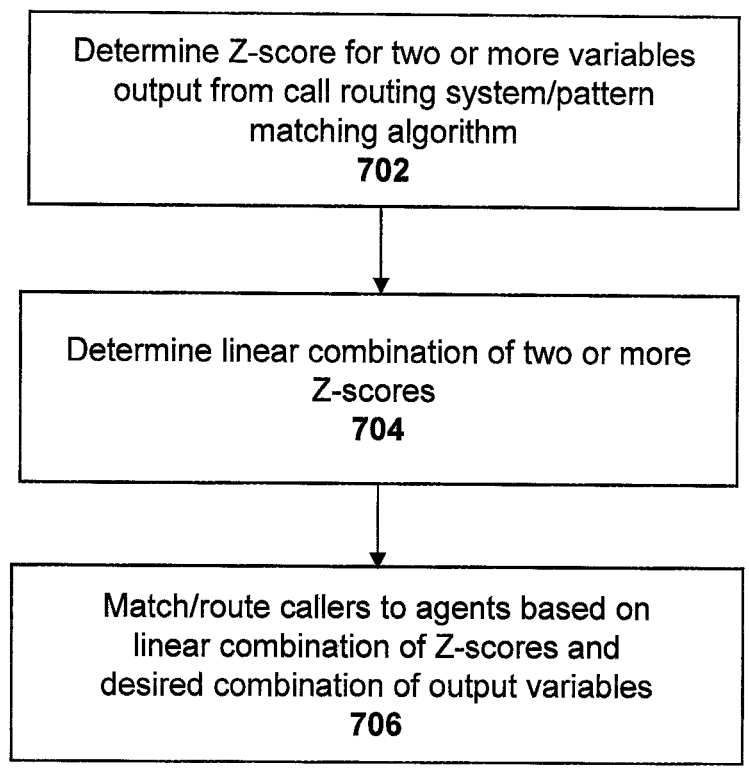
FIG. 7 is a flowchart reflecting an example for optimizing a combination or mix of multiple output variables of a pattern matching algorithm and computer model.

FIG. 7 illustrates an exemplary method for combining multiple output variables of a performance matching algorithm (for matching callers and agents) into a single metric for use in controlling and managing the routing system. The exemplary method includes determining a Z-score (e.g., a dimensionless standard score) for each of two or more variable outputs of the pattern matching algorithm at 702. The Z-score, or standard score, can be computed as follows:

$$z=(x-\mu)/\sigma$$

where x is the raw output of the pattern matching algorithm for a particular output variable, $\mu$ is the mean of the output variable, and $\sigma$ is the standard deviation of the output variable. A Z-score may be computed for any number of output variables of the call routing system (e.g., of the pattern matching algorithm used). Output variables may include or be associated with, for example, revenue generation, cost, customer satisfaction, and the like.

The Z-scores are used at 704 to determine a linear combination of two or more of the output variables, where the linear combination may be selected based on a desired mix or weighting of the output variables. For instance, a call center may determine customer satisfaction is the most important variable and weight revenue generation and cost less than customer satisfaction (e.g., assigning weighting fractions that add up to 1). The linear combination of the determined Z-scores may then be computed to provide a single score based on the multiple output variables and weighting factors. For instance, a call routing center may combine the Z-scores for a desired output of the system (e.g., deciding that one variable is to be weighted more heavily than another variable). The linear combination may then be used by the routing system for routing or matching callers to agents via the pattern matching algorithm at 706. For example, the callers and agents may be matched in an attempt to estimate or maximize the value or score of the determined linear combination of Z-scores.

Figure 8:
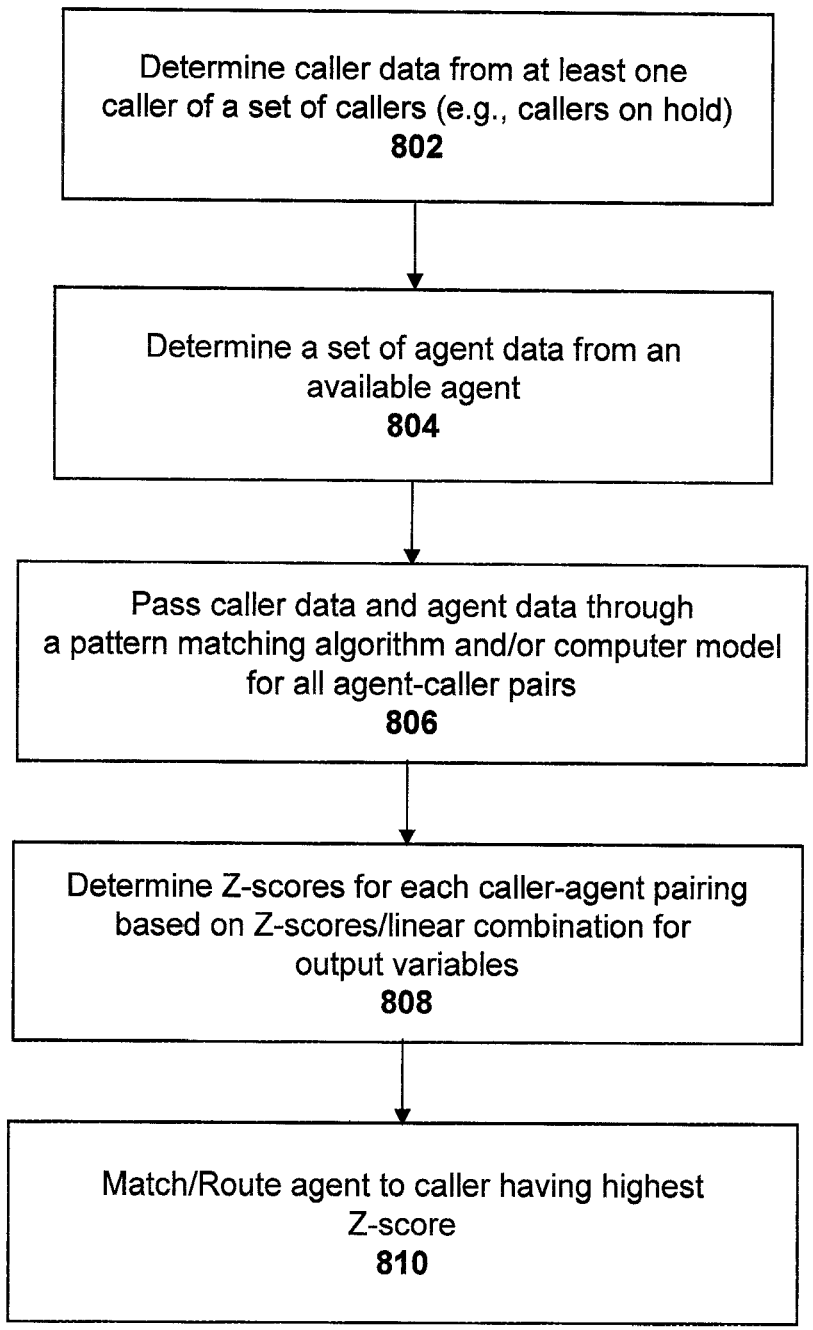
FIG. 8 is a flowchart reflecting another example for optimizing a combination or mix of multiple output variables of a pattern matching algorithm and computer model.

It should be noted that conventionally, for inbound call centers, when many callers are on hold and an agent becomes free the first caller in the queue (e.g., that has been held the longest) is routed to the free agent. As described herein, however, exemplary methods for routing callers includes pairing an available agent to all callers being held, and routing the best matching caller to the agent based on a pattern matching algorithm/computer model and desired output variables thereof. FIG. 8 illustrates a particular exemplary method for optimizing a combination or mix of multiple output variables of a pattern matching algorithm and/or computer model for the particular instance where multiple callers are on hold and one agent becomes free to accept a caller. The exemplary method includes determining a set of caller data from a sample of callers at 802. For example, the caller data may include caller data for all or some of the callers on hold, waiting for an agent, with the call center. The method further includes determining a set of agent data from an agent that becomes available to accept a caller at 804, which may merely be accessed from known agent data.

The method further includes, for each possible agent-caller pair, passing the associated agent and caller data through a pattern matching algorithm/computer model at 806. A Z-score may be determined for each agent-caller pair at 808, which are based on the pattern matching algorithm for each of the output variables (e.g., for each neural network output), as described in greater detail below. The highest scoring agent-caller pairing may then be connected, e.g., the best matching caller based on the Z-scores is routed.

A more detailed, but exemplary, pattern matching algorithm and method for combining multiple variable outputs thereof includes a neural network algorithm or a genetic algorithm. As described (e.g., with respect to FIG. 6), a pattern matching algorithm such as a neural network algorithm that can be trained or refined by comparing actual results against caller and agent data (e.g., comparing input and output data) can learn, or improve its learning of, how matching callers and agents changes the chance of an optimal interaction. The following includes an exemplary neural network pattern matching algorithm, followed by exemplary methods for scaling the output scores and combining the output scores into a composite score for determining caller-agent pairings for a desired outcome.

Initially, various terms of the exemplary pattern matching algorithm are defined to illustrate the operation. Let $A=\{a_i\}$ ($i=1,\ldots,N$) be the set of currently logged in agents in a queue which are available for matching to an incoming caller. Note, these agents may be in one physical call center or be distributed across several call centers and controlled by several Private Branch Exchanges (PBXs). Further, the set of callers can be denoted as:

$$C=\{c_j\} \quad (1)$$

Each agent and caller has associated agent data and caller data, e.g., demographic, psychographic information, etc. (in some cases caller data may not be available, e.g., when the caller's telephone number is either not available or cannot be found in an accessible database). Caller data and agent data can be denoted respectively as:

$$I_{i,k}^A \ (i=1,\ldots,N) \ (k=1,\ldots,P)$$

$$I_{i,k}^C \ (i=1,\ldots,M) \ (k=1,\ldots,Q) \quad (2)$$

where there are P variables describing, for example, demographic and psychographic characteristics of the agents and Q variables describing these characteristics of clients, where P and Q are not necessarily equal.

There are also output variables, which describe certain characteristics of the call center's performance, which it is desired to optimize. The three most commonly used are Revenue, denoted R, cost, which usually is calculated as call handle time, denoted here T, and Satisfaction, denoted S. In this illustrative example only these three exemplary output variables are considered, but it should be understood that more variables could be added or different variables substituted for revenue, cost, and satisfaction. For instance, other variables might include first call resolution, cancellation (e.g., later cancelation of a sale due to buyer's remorse), and the like.

An exemplary pattern matching algorithm or computer model based on a pattern matching algorithm may further include "levers", in this example three levers, for adjusting the degree to which each of the three output variables is optimized in the pattern matching algorithm when making agent-caller matches. These levers may be denoted as:

$$L_R, L_C \ \& \ L_S \ (0 \leq L_R, L_C, L_S \leq 1) \quad (3)$$

where the three values are subject to the constraint:

$$L_R + L_C + L_S = 1 \quad (4)$$

In this particular example, for each output variable of the pattern matching algorithm, a resilient back-propagation (RPROP) neural network has been trained. It will be understood that a RPROP neural network is a learning heuristic for use in neural network architectures for providing an update mechanism based on past outcomes to improve the output of the algorithm over time. The resulting neural network evaluation functions, one each for Revenue, Cost, and Satisfaction, can be as follows:

$$f_R: \mathbb{R}^{P+Q} \to \mathbb{R}$$

$$f_C: \mathbb{R}^{P+Q} \to \mathbb{R}$$

$$f_S: \mathbb{R}^{P+Q} \to \mathbb{R} \quad (5)$$

Each of the evaluation functions takes a vector comprising the caller data and agent data (e.g., demographic, psychographic information, etc.) for one agent and one caller and maps it to a single real number, for example:

$$f_R(I_{i,1}^A, \ldots, I_{i,P}^A, I_{j,1}^C, \ldots, I_{j,Q}^C) = x \quad (6)$$

where the revenue neural network function is mapping the characteristics of the i'th agent and j'th caller to the single real number x.

The above described neural network pattern matching algorithms may then be used by an exemplary system to determine an optimal agent-caller pair from available agents and incoming callers. In one example, there are three types of conditions under which agent-caller pair decisions are made. They include:
 i. Many agents are available and a caller calls in (Inbound) or a call is to be made to the next caller in lead list (Outbound).
 ii. Inbound calls are held and one agent is available.
 iii. Callers are held and more than one agent is available.

A call center typically will operate in condition ii (e.g., as described with respect to FIGS. 4-6). The following examples are largely independent of the above described conditions, however, the most general case iii will be assumed. For instance, suppose at some instant that three agents are available:

$$A^* = \{a_i^*\} \; (i=1,2,3) \quad (7)$$

where the free agents are a subset of $c_1$, $c_2$ the logged in agent pool: $A^* \subset A$. Further, suppose that two callers are queued. This simple example provides that there are six (3×2=9) possible agent-caller pairings:

$a_1^* \leftrightarrow c_1$ $a_1^* \leftrightarrow c_2$ $a_2^* \leftrightarrow c_1$ $a_2^* \leftrightarrow c_2$ $a_3^* \leftrightarrow c_1$ $a_3^* \leftrightarrow c_2 \quad (8)$ The exemplary pattern matching algorithm operates on these six possible pairings to determine the optimal matching output of the six possibilities given the three lever settings $L_R$, $L_C$ & $L_S$, which may be set by the contact routing center for a desired output performance.

In one example, the first step is to evaluate the six possible pairings through the revenue, cost, and satisfaction neural network algorithms. The system looks up the agent data and caller data (e.g., agents' and clients' demographic and psychographic data) to form six vectors of length P+Q and applies the neural network function to each to generate six real numbers. Taking revenue as the example, the system computes:

$$f_R(I_{a_1^*,1}^A, \ldots, I_{a_1^*,P}^A, I_{c_1,1}^C, \ldots, I_{c_1,Q}^C) = r_{1,1}$$

$$f_R(I_{a_1^*,1}^A, \ldots, I_{a_1^*,P}^A, I_{c_2,1}^C, \ldots, I_{c_2,Q}^C) = r_{1,2}$$

$$f_R(I_{a_2^*,1}^A, \ldots, I_{a_2^*,P}^A, I_{c_1,1}^C, \ldots, I_{c_1,Q}^C) = r_{2,1}$$

$$f_R(I_{a_2^*,1}^A, \ldots, I_{a_2^*,P}^A, I_{c_2,1}^C, \ldots, I_{c_2,Q}^C) = r_{2,2}$$

$$f_R(I_{a_3^*,1}^A, \ldots, I_{a_3^*,P}^A, I_{c_1,1}^C, \ldots, I_{c_1,Q}^C) = r_{3,1}$$

$$f_R(I_{a_3^*,1}^A, \ldots, I_{a_3^*,P}^A, I_{c_2,1}^C, \ldots, I_{c_2,Q}^C) = r_{3,2} \quad (9)$$

where $r_{i,j}$ denotes the revenue neural network's output for the pairing of the i'th agent with the j'th caller (note, the notation here is such that $I_{a_1^*,1}^A$ refers to the demographic and psychographic information for agent $a_i^*$). In the same manner sets of six numbers can be calculated, call them $c_{i,j}$ and $s_{i,j}$ being the outputs of the cost and satisfaction neural network functions respectively for the six agent-caller pairings.

The outputs of the neural networks are on a somewhat arbitrary scale, so to compare them with each other they can be rescaled to a common metric. To this end a large number of random pairings between the logged in agents (A) and callers is formed (e.g., using callers and agents beyond the six described above). For example, call center data for the particular queue under consideration from the previous day can be used to form a sample of hundreds, thousands, or more and random matches between agents and callers. For each neural network (e.g., for revenue, cost, and satisfaction) these random pairings are evaluated and a mean and standard deviation of the resulting distributions of neural network outputs may be calculated. For instance, computing the six quantities $\mu_R$, $\sigma_R$, $\mu_C$, $\sigma_C$, $\mu_S$, $\sigma_S$, where $\mu_R$ and $\sigma_R$ are the mean and standard deviation of the revenue neural network output's distribution and similarly for cost and satisfaction.

Using the mean and standard deviations, a Z-score for each of revenue, cost, and satisfaction may be computed for the six agent-caller pairings:

$$Z_{i,j}^R = \frac{r_{1,2} - \mu_R}{\sigma_R} \quad (i=1,2,3 \; j=1,2) \quad (10)$$

$$Z_{i,j}^C = \frac{c_{1,2} - \mu_C}{\sigma_C} \quad (i=1,2,3 \; j=1,2)$$

$$Z_{i,j}^S = \frac{s_{1,2} - \mu_S}{\sigma_S} \quad (i=1,2,3 \; j=1,2)$$

A call center may wish to optimize a combination of the output variables, as expressed by the lever settings, to determine agent-caller pairs. The determined Z-scores may be combined into a composite Z-score and used by the pattern matching algorithm for choosing an optimal agent-caller pair. In one example, a linear combination of the neural network outputs is formed to result in one overall Z for each agent to caller pairing as follows:

$$Z_{1,1} = L_R \times Z_{1,1}^R + L_C \times Z_{1,1}^C + L_S \times Z_{1,1}^S$$

$$Z_{1,2} = L_R \times Z_{1,2}^R + L_C \times Z_{1,2}^C + L_S \times Z_{1,2}^S$$

$$Z_{2,1} = L_R \times Z_{2,1}^R + L_C \times Z_{2,1}^C + L_S \times Z_{2,1}^S$$

$$Z_{2,2} = L_R \times Z_{2,2}^R + L_C \times Z_{2,2}^C + L_S \times Z_{2,2}^S$$

$$Z_{3,1} = L_R \times Z_{3,1}^R + L_C \times Z_{3,1}^C + L_S \times Z_{3,1}^S$$

$$Z_{3,2} = L_R \times Z_{3,2}^R + L_C \times Z_{3,2}^C + L_S \times Z_{3,2}^S \quad (11)$$

From this the system and method can find the i and j for which:

$$Z_{i,j} = \text{Max}(\{Z_{i,j}\}) \quad (12)$$

and match or route agent i with caller j. In this example, with two available agents and three queued callers, the system and method may then match and route the two available agents to two of the three queued callers, choosing the two agent-caller pairs with the highest summed Z-scores.

In one example, instead of choosing the agent-caller pairing with the highest combined Z-score in Equation 11, the method checks whether the highest Z in Equation 11 exceeds a preset threshold Z-score and only assign the caller to the agent when it does. If the threshold is not exceeded by the Z-score's of any of the available agent-caller pairings, the system does not assign a call and waits until more agents and/or callers become available and a pairing does exceed the threshold.

It should be noted, and recognized, that in practice the three outcome variables discussed (i.e., revenue, cost, and satisfaction) are typically not independent. For instance, in many call center situations revenue and cost, e.g., as measured by handle time, are anticorrelated since agents who spend longest on calls tend to have higher sales rates. Therefore, in one example, the lever settings described may be determined from a model taking this into consideration, for example, a regression based model from past data, set-up to maximize a combination of the output variables accounting for their interactions.

Additionally, in some examples, the pattern matching algorithms and Z-scores may be influenced by a hold threshold for a caller, e.g., the length of time a caller has been on hold, which may include a pain threshold of the caller, e.g., via a cost function. For instance, the probability of increased revenue, customer satisfaction, and so on may vary based on the wait time a caller is held before routing to an agent. For example, if a caller is held too long based on a hold threshold or cost function for caller wait time, the probability of a predicted outcome may change (e.g., after one minute on hold the probability of a sale for the particular caller may drop tremendously). As such, the system may route the caller to an otherwise sub-optimum agent match based on the linear combination of Z-scores and output variables. For example, the desired output may be to maximize revenue, however, after a pain threshold is reached for a caller, the system may route the caller in a fashion more heavily weighting customer satisfaction.

In some instances, caller data may be missing or unavailable. For instance, demographic and psychographic data may not be known for a caller, or it may be that the PBX fails to provide the telephone number for a caller. In such cases the exemplary pattern matching algorithm will not perform as well because the $I^C$ values will be unknown. In one example, the algorithm may compute $Z^R$, $Z^{C1 \text{ and } ZS}$ in equation (10) without reference to the client at all. For instance, for each agent in A the system may have historical performance data, that is the values of revenue, cost, and satisfaction associated with each call that agent has handled over a historical period (e.g., a period of days or more such as 30 days). For each agent in the pool a Z-score (one each for revenue, cost and satisfaction performance) may be computed as:

$$\bar{Z}_i^R = \frac{H_i^R - \bar{H}^R}{sd(H^R)} \quad (13)$$

$$\bar{Z}_i^C = \frac{H_i^C - \bar{H}^C}{sd(H^C)} \quad (i=1,\ldots,N)$$

$$\bar{Z}_i^S = \frac{H_i^S - \bar{H}^S}{sd(H^S)}$$

where $H_i^R$ is the average historical revenue performance of agent i, and $\bar{H}^R$ and sd $(H^R)$ are the mean and standard deviation respectively of the historical performances of all N agents in the pool. In the case that a caller's data is missing, the pairings with that caller in Equation 11 have these Z values used.

Missing agent data will generally not occur as gathering agent data is typically under the control of the call routing center. In an instance where some or all agent data is missing, however, the agent can be assigned a Z=0 value, which may give the best estimate, in the absence of agent data, of fit as the average (since the mean of Z values is zero).

It is noted that the call routing center or its clients may modify the linear combination, e.g., change the mixing or weighting of desired output variables, over time. Further, the underlying Z-scores may be recomputed over time, resulting in changes to the linear combination and routing of callers. Optionally, the contact center or its clients may control the mix of output variables over the internet or some another data transfer system. As an example, a client of the contact center could access the mix of output variables currently in use over an internet browser and modify these remotely. Such a modification may be set to take immediate effect and, immediately after such a modification, subsequent caller routings occur in line with the newly establishing combination of Z-scores. An instance of such an example may arise in a case where a contact center client decides that the most important strategic priority in their business at present is the maximization of revenues. In such a case, the client would remotely alter the combination to favor the routing and matching of agents that would generate the greatest probability of a sale in a given contact. Subsequently the client may take the view that maximization of customer satisfaction is more important for their business. In this event, they can remotely alter the combination such that callers are routed to agents most likely to maximize their level of satisfaction. Alternatively, changes may be set to take effect at a subsequent time, for instance, commencing the following morning.

According to another aspect of the exemplary systems and methods described, a visual computer interface and printable reports may be provided to the contact center or their clients to allow them to, in a real-time or a past performance basis, monitor the statistics of agent to caller matches, measure the optimal interactions that are being achieved versus the interactions predicted by the computer model, as well as any other measurements of real time or past performance using the methods described herein. A visual computer interface for changing the weighting on an optimal interaction can also be provided to the contact center or the contact center client, such that they can, as discussed herein, monitor or change the weightings or desired outcome variables in real time or at a predetermined time in the future.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices.

Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 9:
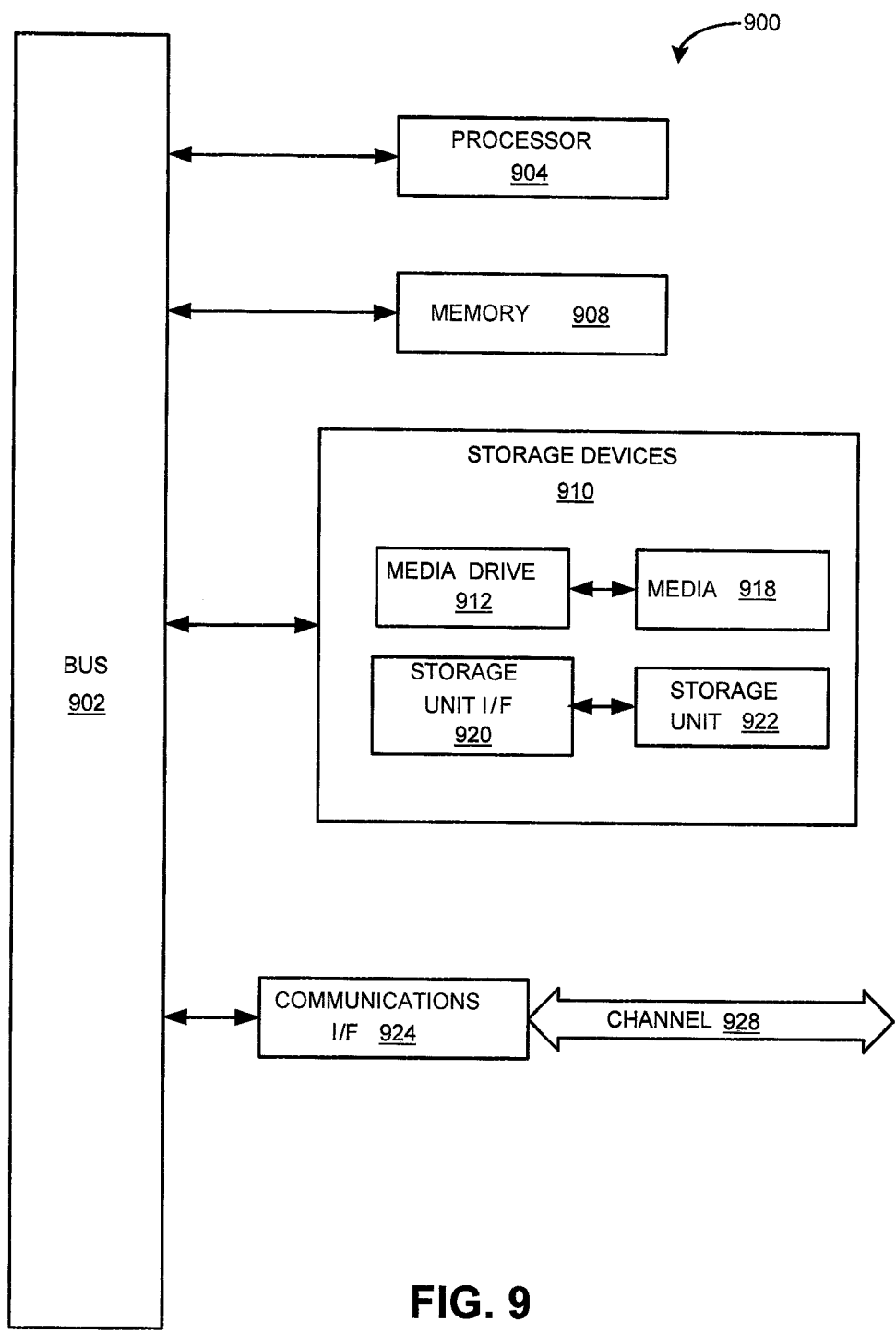
FIG. 9 illustrates a typical computing system that may be employed to implement some or all processing functionality in certain embodiments of the invention.

FIG. 9 illustrates a typical computing system 900 that may be employed to implement processing functionality in embodiments of the invention. Computing systems of this type may be used in clients and servers, for example. Those skilled in the relevant art will also recognize how to implement the invention using other computer systems or architectures. Computing system 900 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 900 can include one or more processors, such as a processor 904. Processor 904 can be implemented using a general or special purpose processing engine such as, for example, a microprocessor, microcontroller or other control logic. In this example, processor 904 is connected to a bus 902 or other communication medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory ("ROM") or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 918 may include, for example, a hard disk, floppy disk, magnetic tape, optical disk, CD or DVD, or other fixed or removable medium that is read by and written to by media drive 912. As these examples illustrate, the storage media 918 may include a computer-readable storage medium having stored therein particular computer software or data.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a USB port), a PCMCIA slot and card, etc. Software and data transferred via communications interface 924 are in the form of signals which can be electronic, electromagnetic, optical or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 908, storage media 918, or storage unit 922. These and other forms of computer-readable media may be involved in storing one or more instructions for use by processor 904, to cause the processor to perform specified operations. Such instructions, generally referred to as "computer program code" (which may be grouped in the form of computer programs or other groupings), when executed, enable the computing system 900 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage media 918, drive 912 or communications interface 924. The control logic (in this example, software instructions or computer program code), when executed by the processor 904, causes the processor 904 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The above-described embodiments of the present invention are merely meant to be illustrative and not limiting. Various changes and modifications may be made without departing from the invention in its broader aspects. The appended claims encompass such changes and modifications within the spirit and scope of the invention.

We claim:

1. A method for routing callers to agents in a call-center routing environment, the method comprising the acts of:

identifying, by one or more computers, caller data comprising at least demographic data for a caller of a set of callers in a queue or a pool, wherein each of the callers has a respective contact time;

identifying, by one or more computers, agent data comprising at least demographic data for agents in a set of agents;

determining, by the one or more computers, a plurality of respective potentials for caller-agent pairings of the caller to each of the agents in the set of agents that the caller is likely to make a purchase when the caller is matched to the respective agent in the pairing, based at least in part on matching the demographic data of the caller to the demographic data of the respective agent using a multi-element pattern matching algorithm, wherein the respective potential for the respective caller-agent pairing is decreased based on a projected wait time for the respective agent; and connecting, by the one or more computers, the caller to one of the agents in the set of agents based at least in part on the respective potential determined for the respective caller-agent pairing.

2. The method of claim 1, further comprising routing the caller to the next available agent if a hold threshold for the caller is exceeded.

3. The method of claim 2, wherein the hold threshold comprises one or more of a time period, number of times the caller is skipped by other callers, or a multiple of a predicted hold time.

4. The method of claim 2, wherein the hold threshold is adjustable by a user.

5. A system for routing callers to agents in a call-center environment, the system comprising:

one or more computers configured to:

identify, by one or more computers, caller data comprising at least demographic data for a caller of a set of callers in a queue or a pool, wherein each of the callers has a respective contact time;

identify, by one or more computers, agent data comprising at least demographic data for agents in a set of agents;

determine, by the one or more computers, a plurality of respective potentials for caller-agent pairings of the caller to each of the agents in the set of agents that the caller is likely to make a purchase when the caller is matched to the respective agent in the pairing, based at least in part on matching the demographic data of the caller to the demographic data of the respective agent using a multi-element pattern matching algorithm, wherein the respective potential for the respective caller-agent pairing is decreased based on a projected wait time for the respective agent; and connect, by the one or more computers, the caller to one of the agents in the set of agents based at least in part on the respective potential determined for the respective caller-agent pairing.

6. The system of claim 5, further comprising logic for routing the caller to the next available agent if a hold threshold for the caller is exceeded.

7. The system of claim 6, wherein the hold threshold comprises one or more of a time period, number of times the caller is skipped by other callers, or a multiple of a predicted hold time.

8. The system of claim 6, wherein the hold threshold is adjustable by a user.

9. Computer readable storage medium comprising computer readable instructions for carrying out, when executed on one or more computers, a method comprising the acts of:

identifying, by one or more computers, caller data comprising at least demographic data for a caller of a set of callers in a queue or a pool, wherein each of the callers has a respective contact time;

identifying, by one or more computers, agent data comprising at least demographic data for agents in a set of agents;

determining, by the one or more computers, a plurality of respective potentials for caller-agent pairings of the caller to each of the agents in the set of agents that the caller is likely to make a purchase when the caller is matched to the respective agent in the pairing, based at least in part on matching the demographic data of the caller to the demographic data of the respective agent using a multi-element pattern matching algorithm, wherein the respective potential for the respective caller-agent pairing is decreased based on a projected wait time for the respective agent; and connecting, by the one or more computers, the caller to one of the agents in the set of agents based at least in part on the respective potential determined for the respective caller-agent pairing.

10. The computer readable storage medium of claim 9, further comprising instructions for routing the caller to the next available agent if a hold threshold for the caller is exceeded.

11. The computer readable storage medium of claim 10, wherein the hold threshold comprises one or more of a time period, number of times the caller is skipped by other callers, or a multiple of a predicted hold time.

12. The computer readable storage medium of claim 10, wherein the hold threshold is adjustable by a user.

* * * * *